2,861,079
PROCESS FOR MAKING UNSATURATED HYDANTOINS

Edgar C. Britton and Howard T. Smith, Midland, Mich., assignors to The Dow Chemical Company, Midland, Mich., a corporation of Delaware No Drawing. Application June 4, 1956
Serial No. 588,984

14 Claims. (Cl. 260—309.5)

This invention concerns a process for making unsaturated hydantoins. It relates more particularly to a method and agents for carrying out the reaction of an aldehyde with hydantoin to form a corresponding unsaturated hydantoin.

U. S. Patent No. 2,605,282 makes vanillylidene hydantoin by reacting vanillin and hydantoin in admixture with an anhydrous or substantially anhydrous dialkanolamine such as diethanolamine or diisopropanolamine in amount corresponding to at least one molecular proportion of the dialkanolamine per mole of the vanillin starting material, or in an alcoholic solution of such dialkanolamine as a reaction medium. The reactions involved are illustrated by the equation:

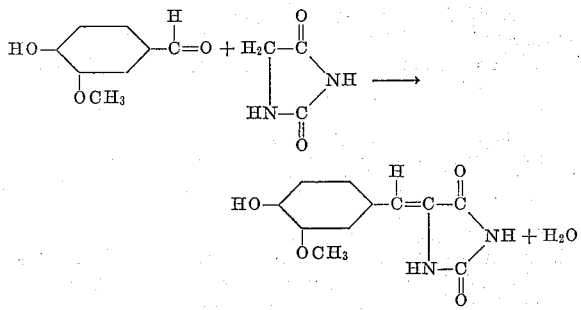

The method of the reference is not suited for carrying out the condensation of aliphatic aldehydes with hydantoin to yield the corresponding unsaturated hydantoins. The method has a further disadvantage that an anhydrous or substantially anhydrous solvent reaction medium is required.

It has now been discovered that unsaturated hydantoins can readily be prepared in good yield by carrying out the reaction or condensation of an aldehyde with hydantoin in an aqueous solution or a solution of a lower aliphatic alcohol containing a minor amount by weight of a monoalkanolamine as hereinafter described.

According to the invention any aliphatic aldehyde containing at least 4 carbon atoms in the molecule or an aromatic aldehyde can be employed in the process. Examples of suitable aldehydes are butyraldehyde, isobutyraldehyde, valeraldehyde, isovaleraldehyde, caproaldehyde, enanthaldehyde, nonaldehyde, crotonaldehyde, tiglic aldehyde, benzaldehyde, tolualdehyde, alpha-tolualdehyde, cinnamaldehyde, salicylaldehyde, anisaldehyde, para-hydroxybenzaldehyde, vanillin, succinaldehyde, adipaldehyde, etc. The aldehydes may contain from 4 to 9 or more carbon atoms in the molecule. Aliphatic aldehydes containing from 4 to 8 carbon atoms and aromatic aldehydes are preferred.

The alkonalomines to be employed as condensing agents can be any water-miscible monoalkanolamine such as ethanolamine, isopropanolamine, butanolamine, hexanolamine, etc. The alkanolamines preferably contain from 2 to 4 carbon atoms in the molecule. The monoalkanolamine can be employed in amounts which range from about 0.2 to 10, preferably from 0.5 to 2, gram molecular proportions of the monoalkanolamine per gram molecular equivalent proportion of the aldehyde starting material. The alkanolamine is preferably used in admixture with water in amount sufficient to form an aqueous solution containing from 1 to 10 percent by weight of the monoalkanolamine.

The aldehyde and the hydantoin can be employed in any desired proportions, but for reasons of economy are usually employed in equimolecular or substantially equimolecular proportions, e. g. in amounts corresponding to from 0.8 to 1.2 moles of the aldehyde per mole of the hydantoin.

The reaction of the aldehyde and the hydantoin can be carried out while having the reactants dissolved in water, a lower aliphatic alcohol containing from one to four carbon atoms in the molecule such as methyl alcohol, ethyl alcohol, n-propyl alcohol, isopropyl alcohol or tertiary butyl alcohol, or an aqueous solution of such alcohols, at temperatures between 50° and 150° C., preferably from 80° to 100° C., and at atmospheric or superatmospheric pressures. The reaction is usually carried out under the reflux temperatures of the mixture and at atmospheric pressures or thereabout.

The aldehyde and the hydantoin can be mixed with or dissolved in water, a water-miscible lower aliphatic alcohol or an aqueous solution of such alcohol in the desired proportions and a desired amount of the monoalkanolamine added thereto. The monoalkanolamine has an action of solubilizing the aldehyde in the aqueous reaction medium and is usually employed in a concentration sufficient to dissolve the reactants. Alternatively, the monoalkanolamine can be dissolved in water, an alcohol or a mixture of water and an alcohol to form a solution containing the amine in a concentration of say from 5 to 20 percent by weight, and the aldehyde and hydantoin starting materials added or mixed with the solution in the desired proportions. The order in which the reactants and the condensing agent, i. e., the monoalkanolamine, are mixed with one another is not important.

The reaction medium containing the monoalkanolamine condensing agent can be employed in any desired proportion, but is usually employed in amounts corresponding to from 500 to 1,000 milliliters of the solution per gram molecular proportion of the aldehyde starting material.

In a preferred practice, the aldehyde and the hydantoin are mixed with or dissolved in water, suitably at temperatures of from 50° to 90° C. in the desired proportions. The mixture is stirred or agitated and a monoalkanolamine is added in amount sufficient to form with the water a solution containing from 5 to 40, preferably from 5 to 20, percent by weight of the alkanolamine. Heating of the resulting mixture is continued at reaction temperatures between 50° and 150° C., preferably from 80° to 100° C., and at atmospheric or superatmospheric pressures at least sufficient to maintain the mixture substantially in liquid condition. The reaction is usually complete in a period of from 0.5 to 4 hours, but greater or lesser reaction times can be employed.

The product is recovered in usual ways, e. g. by acidifying the reacted mixture, suitably to a pH value of from 2 to 4, cooling the acidic mixture to crystallize or precipitate the product and separating the solid material by filtering. The product can be further purified in usual ways, e. g. by crystallization from a solvent.

The following examples illustrate ways in which the principle of the invention has been applied, but are not to be construed as limiting its scope.

Example 1

In each of a series of experiments, a charge of 15.2 grams (0.1 mole) of vanillin and 10 grams (0.10 mole) of hydantoin was dissolved in from 100 to 125 ml. of water at 70° C. Thereafter 0.15 gram molecular proportion of a monoalkanolamine as identified below was added. The resulting mixture was heated at a temperature of 90° C. for a period of 4 hours, then was cooled to about 50° C. and was made acidic with 5-normal aqueous hydrochloric acid solution to bring the solution to a pH value of 4. The acidic mixture was cooled and maintained at a temperature of 10° C. for a period of one hour. The product separated as a solid precipitate. It was separated from the liquid by filtering, was washed with cold water and was dried. The percent yield of vanillylidene-hydantoin based on the hydantoin initially used and the melting point of the product is reported below, together with naming of the monoalkanolamine condensing agent employed.

| Monoalkanolamine | Vanillylidene hydantoin | |
|---|---|---|
| | Yield, percent | M. P., °C. |
| Ethanolamine | 95 | 260–264 |
| Isopropanolamine | 87 | 259–262.5 |
| Butanolamine | 95 | 250–255 |

Example 2

A charge of 36 grams (0.5 mole) of isobutyraldehyde and 50 grams (0.5 mole) of hydantoin were added to 500 ml. of water and the mixture heated to a temperature of 60° C. A charge of 45.5 grams (0.75 mole) of ethanolamine was added. The resulting mixture was heated at temperatures between 85° and 90° C. for a period of 5 hours. Thereafter, 56 ml. of an aqueous 12-normal hydrochloric acid solution was added to bring the pH of the solution to a value between 3.5 and 4.0. The mixture was cooled and maintained at temperatures between 0° and 10° C. for a period of 1.5 hours. The product precipitated. It was separated by filtering and was washed and dried under reduced pressure at a temperature of 60° C. There was obtained 52 grams of 5-isobutylidene hydantoin. The product was recrystallized from water. It had a melting point of from 203° to 204° C.

Example 3

A charge of 10.6 grams (0.1 mole) of benzaldehyde and 10 grams (0.1 mole) of hydantoin were added to 125 cc. of water. The mixture was heated to a temperature of 70° C. and 9.1 grams (0.15 mole) of ethanolamine were added. A clear solution was obtained. The solution was heated at temperatures between 80° and 90° C. for a period of 4 hours. Thereafter, 10.5 cc. of 12-normal aqueous hydrochloric acid solution was added and maintained at a temperature of 10° C. for a period of 2 hours. The product precipitated. It was separated, washed with cold water and dried in a vacuum oven at a temperature of 60° C. There was obtained 17 grams of 5-benzylidene hydantoin having a melting point of 220.5°–222.5° C. The yield of said product was 90.5 percent based on the hydantoin initially used.

Example 4

A charge of 12.2 grams (0.1 mole) of para-hydroxybenzaldehyde and 10 grams (0.1 mole) of hydantoin were reacted in the presence of 9.1 grams (0.15 mole) ethanolamine employing procedure similar to that employed in Example 3. There was obtained 18.5 grams of 5-(para-hydroxybenzylidene)-hydantoin having a melting point of 313°–314° C.

Example 5

A charge of 244 grams (2 moles) of salicylaldehyde and 200 grams (2 moles) of hydantoin were added to 2 liters of water and the mixture heated to 70° C. A charge of 182 grams of ethanolamine was added. A clear solution was obtained. The solution was heated at temperatures between 90° and 95° C. for a period of 4 hours. Thereafter, it was cooled to 70° C. and 220 cc. of an aqueous 12-normal hydrochloric acid solution added. The resulting mixture had a pH value between 3.5 adn 4.0. The mixture was cooled and maintained at a temperature of 10° C. for a period of 2 hours. The product precipitated. It was separated, washed and dried. There was obtained 348 grams of 5-salicylidene hydantoin melting at temperatures between 272° and 274° C. The yield of said product was 85 percent based on the hydantoin initially used.

Example 6

A charge of 30.4 grams (0.2 mole) of vanillin and 20 grams of hydantoin were added to 100 cc. of water and the mixture heated to a temperature of 70° C. A charge of 19.2 grams (0.3 mole) of ethanolamine was added. A clear solution was obtained. The solution was heated at temperatures between 85° and 90° C. for a period of 4 hours. Thereafter, it was cooled to 70° C. and an aqueous 12-normal hydrochloric acid solution added to bring the mixture to a pH value between 3.5 and 4.0. The mixture was cooled and maintained at a temperature of 10° C. for a period of 2 hours. The product precipitated. It was separated, washed with water and dried. There was obtained 41 grams of 5-vanillylidene hydantoin melting at temperatures of 273.5–278° C. The yield of said product was 87.5 percent based on the hydantoin initially used.

Example 7

A charge of 15.2 grams (0.1 mole) of vanillin and 10 grams (0.1 mole) of hydantoin were added to 100 cc. of water and the mixture heated to a temperature of 70° C. A charge of 9.1 grams (0.15 mole) of ethanolamine was added. A clear solution was obtained. The solution was heated at a temperature of 90° C. for a period of 4 hours. It was cooled to 70° C., acidified with 12-normal aqueous hydrochloric acid solution, to a pH value between 3.5 and 4.0, then was further cooled and maintained at a temperature of 10° C. for a period of 2 hours. The product precipitated. It was separated, was washed with 100 cc. of a solution of equal parts by volume of water and methyl alcohol and was dried. There was obtained 21.6 grams of 5-vanillylidene hydantoin melting at 273°–278° C. The yield of said product was 92.4 percent based on the hydantoin initially used.

For purpose of comparison, the reaction of vanillin and hydantoin was carried out in the presence of 15.75 grams (0.15 mole) of diethanolamine employing procedure similar to that described above. There was obtained only 6.2 grams of 5-vanillylidene hydantoin melting at 248°–253° C. The yield of said product was only 26.5 percent, based on the hydantoin initially used.

Example 8

A charge of 15.2 grams (0.1 mole) of vanillin, 10 grams (0.1 mole) of hydantoin and 9.1 grams (0.15 mole) of ethanolamine was dissolved in 100 ml. of n-propyl alcohol. The mixture was heated at reflux temperatures, 94°–96° C., for a period of 8 hours, then cooled and let stand overnight. Thereafter, the mixture was acidified to a pH value of from 2–3 with an aqueous 5-normal hydrochloric acid solution. Fifty cubic centimeters of water was added. The resulting mixture was stirred and maintained at temperatures between 0° and 10° C. for a period of one hour. A solid product precipitated. It was separated by filtering, was washed and dried in a vacuum oven at a temperature of 60° C. There was obtained 20 grams of 5-vanillylidene hydantoin melting at 247°–251° C. The yield of said product was 85.5 percent based on the hydantoin initially used.

*Example 9*

A charge of 15.2 grams (0.1 mole) of vanillin and 10 grams (0.1 mole) of hydantoin was added to 100 cc. of water. The mixture was heated to 50° C. and 3.7 grams (0.06 mole) of ethanolamine was added. The resulting mixture was heated at temperatures between 85° and 90° C. for a period of 4.25 hours. Five cubic centimeters of 12-normal aqueous hydrochloric acid were added to bring the solution to a pH value between 2 and 3. The mixture was cooled to temperatures between 0° and 10° C. and stirred for one hour. The product separated as crystals. The crystalline product was separated by filtering, was washed with water and dried under vacuum in an oven at a temperature of 70° C. There was obtained 20.4 grams of vanillylidene hydantoin melting at 273.5°–277° C. The yield of said product was 87 percent, based on the hydantoin initially used.

We claim:

1. In a process for making an unsaturated hydantoin wherein hydantoin is reacted with an aldehyde, the steps which consist in heating approximately equimolecular proportions of hydantoin and an aldehyde containing at least 4 carbon atoms in the molecule at reaction temperatures between 50° and 150° C. while having the reactants dissolved in a liquid reaction medium selected from the group consisting of water, a lower aliphatic alcohol containing from 1 to 4 carbon atoms in the molecule and mixtures of water and such alcohols, and a monoalkanolamine containing from 2 to 4 carbon atoms in the molecule in amount corresponding to from 0.2 to 10 gram molecular proportions of the monoalkanolamine per gram mole of the hydantoin.

2. In a process for making an unsaturated hydantoin wherein hydantoin is reacted with an aldehyde, the steps which consist in heating approximately equimolecular proportions of hydantoin and an aldehyde containing at least 4 carbon atoms in the molecule at reaction temperatures between 50° and 150° C. while having the reactants dissolved in a liquid reaction medium consisting of water and a monoalkanolamine containing from 2 to 4 carbon atoms in the molecule in amount corresponding to from 0.2 to 10 gram molecular proportions of the monoalkanolamine per gram mole of the hydantoin.

3. A process as claimed in claim 1, wherein the liquid reaction medium is a lower aliphatic alcohol containing from 1 to 4 carbon atoms in the molecule.

4. A process as claimed in claim 1, wherein the aldehyde is a saturated aliphatic aldehyde containing from 4 to 9 carbon atoms in the molecule.

5. A process as claimed in claim 4, wherein the aliphatic aldehyde is isobutyraldehyde.

6. A process as claimed in claim 1, wherein the aldehyde is an aromatic aldehyde.

7. A process as claimed in claim 6, wherein the aromatic aldehyde is vanillin.

8. A process as claimed in claim 6, wherein the aromatic aldehyde is benzaldehyde.

9. A process as claimed in claim 6, wherein the aromatic aldehyde is salicylaldehyde.

10. A process as claimed in claim 6, wherein the aromatic aldehyde is para-hydroxybenzaldehyde.

11. A process as claimed in claim 6, wherein the monoalkanolamine is ethanolamine.

12. A process as claimed in claim 6, wherein the monoalkanolamine is butanolamine.

13. A process as claimed in claim 6, wherein the monoalkanolamine is isopropanolamine.

14. A process as claimed in claim 1, wherein the liquid reaction medium is a mixture of water and a lower aliphatic alcohol containing from 1 to 4 carbon atoms in the molecule.

References Cited in the file of this patent

UNITED STATES PATENTS

| | | |
|---|---|---|
| 2,435,399 | Livak et al. | Feb. 3, 1948 |
| 2,605,282 | Britton et al. | July 29, 1952 |

OTHER REFERENCES

Boyd et al.: Chem. Abstracts, vol. 29, col. 5094 (1935).

Phillips et al.: J. Org. Chem., vol. 16, pages 954–62 (1951).